(12) United States Patent
Lynderup

(10) Patent No.: US 8,465,237 B2
(45) Date of Patent: Jun. 18, 2013

(54) ARRANGEMENT AND METHOD FOR TRANSPORTING A WIND TURBINE ROTOR

(75) Inventor: Henrik Fomsgaard Lynderup, Skals (DK)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 13/307,348

(22) Filed: Nov. 30, 2011

(65) Prior Publication Data

US 2012/0148361 A1 Jun. 14, 2012

(30) Foreign Application Priority Data

Dec. 8, 2010 (EP) .................................. 10194166

(51) Int. Cl.
*B60P 3/40* (2006.01)

(52) U.S. Cl.
USPC ............................................................ 410/44

(58) Field of Classification Search
USPC ........................................ 410/44; 416/244 R
See application file for complete search history.

(56) References Cited

U.S. PATENT DOCUMENTS

| 4,591,064 | A  | * | 5/1986  | Gerhard     | 220/1.5   |
|-----------|----|---|---------|-------------|-----------|
| 8,322,954 | B2 | * | 12/2012 | ten Thoren  | 410/44    |
| 2009/0266275 | A1 | * | 10/2009 | Feeney   | 108/55.1  |
| 2010/0293781 | A1 |   | 11/2010 | Foo et al. |          |
| 2011/0293385 | A1 | * | 12/2011 | Stahl et al. | 410/44 |
| 2012/0195768 | A1 | * | 8/2012  | Van Nood et al. | 416/244 R |

FOREIGN PATENT DOCUMENTS

| WO | WO 9914490 A1 | 3/1999 |
| WO | WO 2009068038 A1 | 6/2009 |

* cited by examiner

*Primary Examiner* — H Gutman

(57) ABSTRACT

An arrangement for transporting a rotor of a wind turbine at sea is provided. The arrangement includes a vessel having a deck. Moreover, the arrangement includes at least one rotor including a hub and at least one blade affixed to the hub. The hub is positioned on the deck in such a way that the at least one blade is at least partially located above the sea surface and that the center axis of the hub is tilted in relation to the deck so as to increase the distance between the at least one blade and the sea surface. Furthermore, a method for transporting a wind turbine rotor at sea on a vessel having a deck is also provided.

18 Claims, 3 Drawing Sheets

ARRANGEMENT AND METHOD FOR TRANSPORTING A WIND TURBINE ROTOR

CROSS REFERENCE TO RELATED APPLICATIONS

This application claims priority of European Patent Office application No. 04015805.4 EP filed Dec. 8, 2010, which is incorporated by reference herein in its entirety.

FIELD OF INVENTION

The invention relates to an arrangement for transporting a wind turbine rotor and to a method for transporting such a rotor at sea.

BACKGROUND OF INVENTION

Offshore installations of wind turbines require transportation of the wind turbine components from an onshore location to the offshore installation site. An increasing number of offshore wind projects lead to higher demands for transportation and installation equipment and methods.

It is desired to reduce the amount of work to be undertaken offshore. Therefore, arrangements and methods of transporting wind turbine components often focus on maximizing the number of components loaded on board a vessel and transported at once.

Moreover, transportation methods and arrangements are known focusing on minimizing the required transportation and installation time of offshore wind turbines by transporting pre-assembled units such as towers, nacelles or rotors.

Here, the rotors are generally transported as deck cargo in such a way that the blades project over the deck, whereby problems occur when the rotors are transported in rough waters.

Due to the long and elastic blades of modern wind turbine rotors and vessel movements, the tips of the blades may flex and get in contact with water which in turn may cause damages to the rotors.

SUMMARY OF INVENTION

Therefore, it is the aim of the present invention to provide an arrangement and a method for transporting an at least partly assembled rotor at sea which allow for securely transporting the rotor during different sea conditions.

The aim of the invention is achieved by the features of the claims.

Further aspects of the invention are subject of the dependent claims.

The present invention relates to an arrangement for transporting a rotor of a wind turbine at sea. The arrangement comprises a vessel having a deck and at least one rotor. The at least one rotor in turn comprises a hub and at least one blade affixed to the hub.

Furthermore, the hub is positioned on the deck in such a way that the at least one blade is at least partly located above the sea surface. The center axis of the hub is tilted in relation to the deck so as to increase the distance between the at least one blade and the sea surface.

In addition, the present invention relates to a method for transporting a wind turbine rotor at sea with a vessel having a deck. The method comprises the step of positioning a rotor with a hub and a blade on the deck in such a way that the center axis of the hub is tilted in relation to the deck so as to increase the distance between the blade and the sea surface.

Here, the at least one blade tends inclined upwardly which leads to a greater clearance below the part of the blade projecting over the vessel. Thus, the inventive arrangement and method allow for transporting a wind turbine rotor also during heavier sea.

Hence, the so-called "window" opened for transportation of wind turbine components at sea is enlarged which in turn minimizes the overall installation time of offshore wind turbines.

The invention will be described by way of example in more detail in the following.

BRIEF DESCRIPTION OF THE DRAWINGS

The drawings show preferred configurations and do not limit the scope of the invention.

DETAILED DESCRIPTION OF INVENTION

Figure 1:
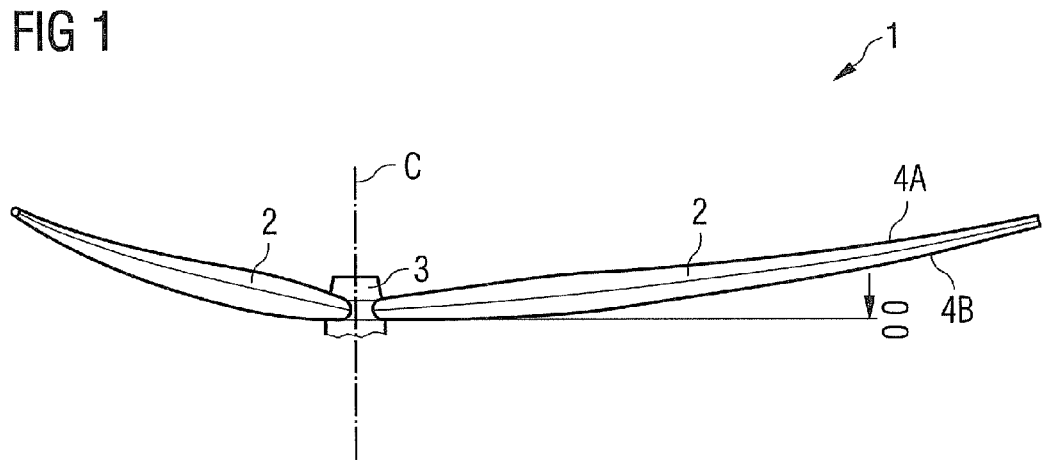
FIG. 1 shows a schematic drawing of an assembled rotor.

FIG. 1 shows an exemplary rotor assembly comprising a hub 3 and two rotor blades 2. The hub 3 has a center axis C which is equivalent to the rotational axis of the hub 3. As shown in FIG. 1, the blades 2 may be curved to avoid that the blades 2 hit the tower of the wind turbine when mounted. The curved blades 2 are bended such that they have a substantially concave face (4A) and a substantially convex face (4B).

Figure 2:
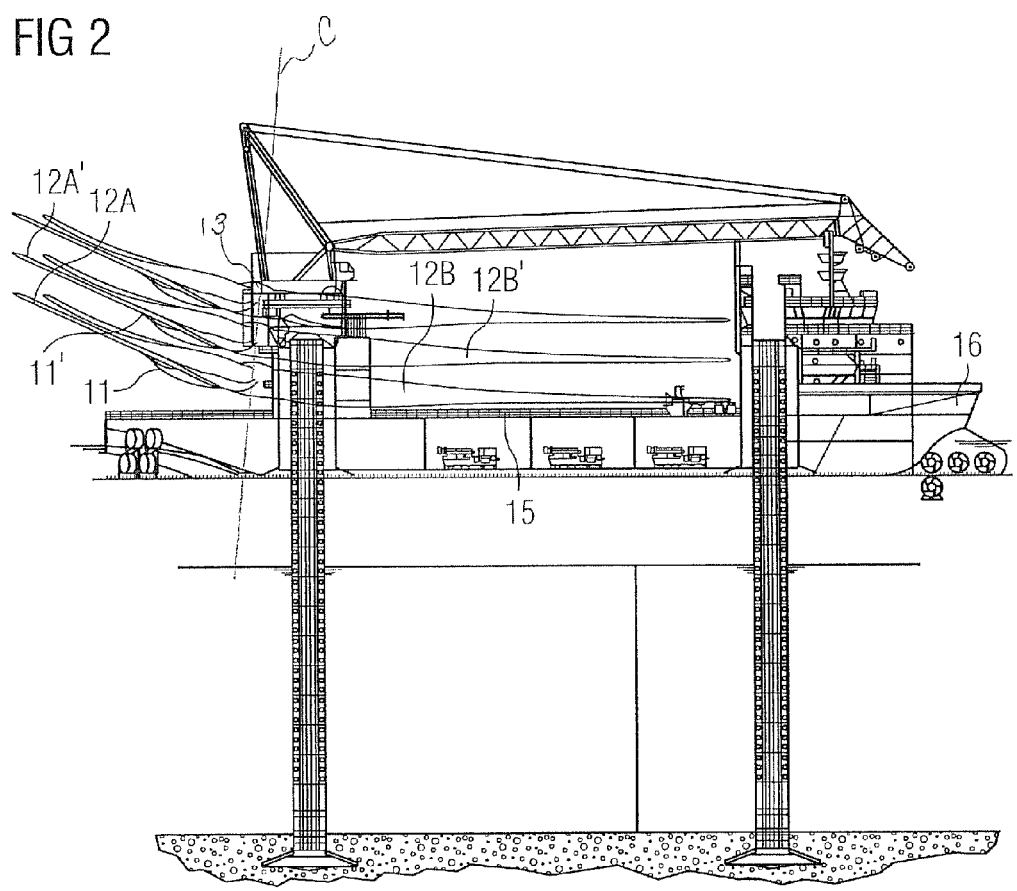
FIG. 2 shows a schematic drawing of a side view of an arrangement according to an embodiment of the invention.

FIG. 2 shows an embodiment of the invention. The arrangement comprises a water vessel 16 with a cargo deck 15 suitable for loading bulky equipment. Here, the term water vessel 16 is used for any kind of watercrafts, water vehicles or ships, including barges, cargo-carrying vessels, coastal vessels and transport ships.

Moreover, the arrangement comprises at least one rotor 11 with a hub 13 and three rotor blades 12A,12B, wherein the blades 12A,12B are mounted or affixed to the hub 13. The at least one rotor 11 could also be partly assembled with just one or two blades 12A,12B and could have more than three blades as well.

The at least one rotor 11 is arranged on the deck 15 of the vessel 16 in such a way that the at least one blade 12A projects over the deck 15. That means that the blade 12A is located at least partially above the sea surface. In addition, the hub 13 is positioned on the deck 15 such that the center axis C of the hub 13 is tilted in relation to the deck 15.

In another embodiment of the invention, the hub 13 is positioned on the deck 15 in such a way that the center axis C of the hub 13 is tilted substantially along the longitudinal direction of the vessel 16.

In yet another embodiment of the invention, the hub 13 is positioned on the deck 15 in such a way that the center axis C of the hub 13 is tilted substantially towards the center of the deck 15.

In yet a further embodiment of the invention, the tilting angle between the center axis of the hub and the deck 15 is in a range of 3 to 15 degree.

By arranging the hub in a tilted manner in relation to the deck 15, as described before, maximum clearance is achieved between the sea surface and the blade 12A which is at least partially located above the sea surface.

In a further embodiment of the invention, the at least one blade 12A has a blade tip and is bended such that it has a substantially concave face 4A and a substantially convex face 4B. The form of the blade is also illustrated in FIG. 1. When the blade is mounted, the curved form of the blade 12A, reduces, the risk of the blade hitting the tower during high wind due to the wind pressure.

The substantially convex face 4B of the blade 12A faces the sea surface and/or the deck 15 and the substantially concave face 4A of the blade 12A is directed upwards. Thus, the blade is bended off the water and the distance between the tip of the blade 21 and the sea surface is further increased.

In another embodiment, a further rotor 11' may be located on top of the rotor 11, as illustrated in FIG. 2.

In this embodiment, the rotor 11 which is positioned on the deck 15, hereinafter called first rotor 11, and a further rotor 11', hereinafter called second rotor 11', are arranged one upon the other.

The first rotor 11 and the second rotor 11' are stacked in such a way that the center axes of their hubs are tilted with the same tilting angle in relation to the deck 15 or to the deck plane 15.

Here, the hub of the first rotor 11 is also positioned on the deck 15 in such a way that the at least one blade 12A is located at least partially above the sea surface and that the center axis of the hub is tilted in relation to the deck 15. The second rotor 11' may just rest on the first rotor 11 or may be mounted on top of the first rotor 11 in a suitable support arrangement.

In addition, one or more further rotors 11" may be located above the first 11 and second rotor 11', wherein the hubs of the further rotors 11" are tilted in the same manner.

Figure 3:
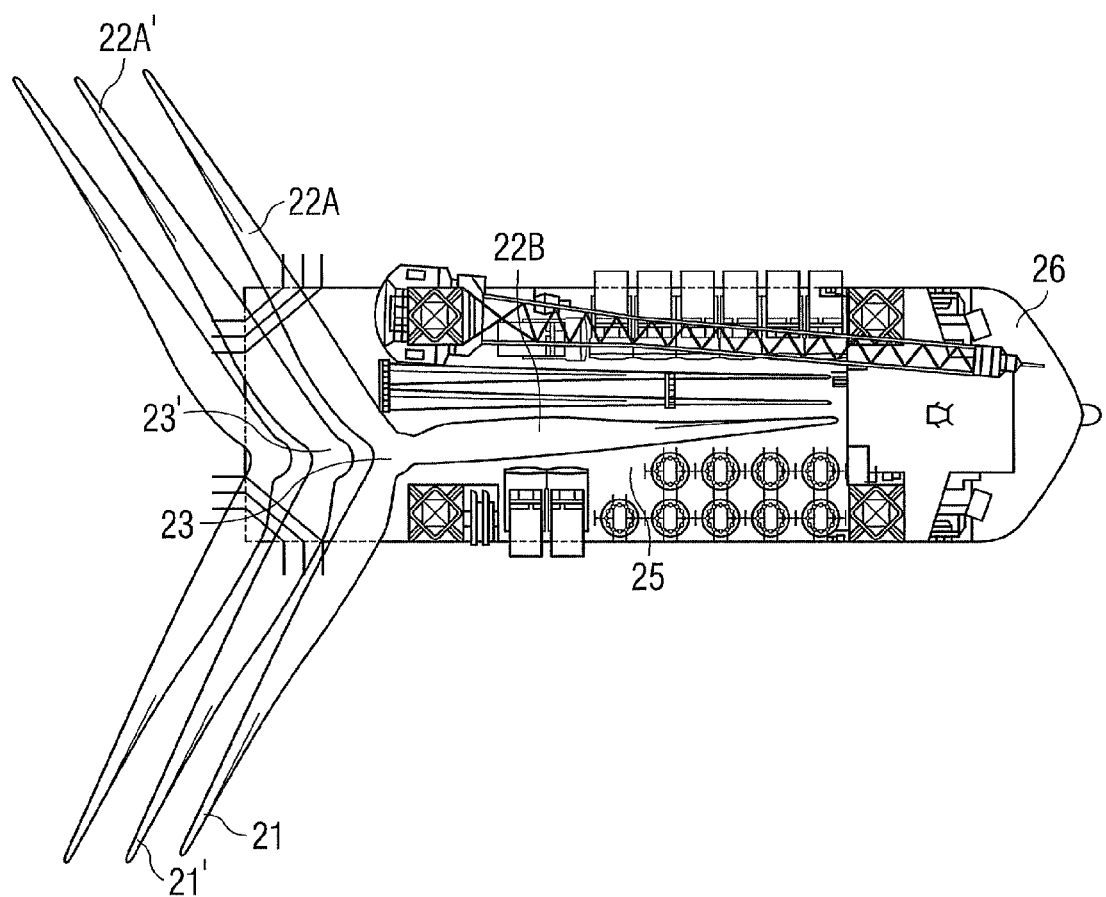
FIG. 3 shows a schematic drawing of a top view of an arrangement according to another embodiment of the invention.

In FIG. 3 an embodiment of the invention is shown, which differs from the embodiment mentioned above in that the hub 23' of the second rotor 21' is located on the deck 25 of the vessel 26 adjacent to the hub 23 of the first rotor 21.

The hub 23' of the second rotor 21' is positioned on the deck 25 in such a way that the center axis of the hub 23' of the second rotor 21' is tilted in relation to the deck 25 in the same manner as the hub 23 of the first rotor 21. The at least one blade 22A' of the second rotor 21' is at least partially located above the sea surface.

In a further embodiment of the invention, also shown in FIG. 3, the first rotor 21 comprises a first blade 22A and a second blade 22B, wherein the first blade 22A is at least partially located above the sea surface and the second blade 22B is located entirely above the deck 25.

Furthermore, the inventive solution comprises a method for transporting a rotor 11,11',21,21' of a wind turbine at sea on a vessel 16,26 having a deck 15,25. The method comprises the step of positioning a rotor 11,11',21,21' on the deck 15,25 of the vessel 16,26.

The rotor 11,11',21,21' comprising hub and blade is positioned on the deck 15,25 in such a way that the center axis of the hub is tilted in relation to the deck 15,25.

After having positioned the rotor 11,11',21,21' on the deck 15,25 of the vessel 16,26, the rotor 11,11',21,21' is transported at sea, for instance from an onshore location to an offshore installation site.

During transport, the hub of the rotor 11,11',21,21' remains tilted in relation to the deck 15,25. Thus, the clearance below the part of the blade projecting over the deck 15,25 is enhanced and the rotor 11,11',21,21' may be transported also in case of heavier sea conditions.

I claim:

1. An arrangement for transporting a rotor of a wind turbine at sea, comprising:
    a vessel including a deck; and
    a rotor including a hub and a blade affixed to the hub,
    wherein the hub is positioned on the deck in such a way that the blade is at least partially located above the sea surface and that a center axis of the hub is tilted in relation to the deck so as to increase the distance between the blade and the sea surface.

2. The arrangement according to claim 1, wherein the hub is positioned on the deck in such a way that the center axis of the hub is tilted substantially along a longitudinal direction of the vessel.

3. The arrangement according to claim 1, wherein the hub is positioned on the deck in such a way that the center axis of the hub is tilted substantially towards the center of the deck.

4. The arrangement according to claim 1, wherein a tilting angle between the center axis of the hub and the deck is in a range of 3 to 15 degrees.

5. The arrangement according to claim 1,
    wherein the blade includes a blade tip, a substantially concave face and a substantially convex face, and
    wherein the substantially convex face is directed downwards in relation to the deck and the substantially concave face is directed upwards in relation to the deck such that the blade is bended off the sea surface and the distance between the blade tip and the sea surface is further increased.

6. The arrangement according to claim 1,
    wherein a first rotor and a second rotor are arranged on the deck,
    wherein the first rotor comprises a first hub and the second rotor comprises a second hub,
    wherein at least one blade is affixed to each of the hubs;
    wherein the first hub and the second hub are positioned on the deck in such a way that the blades affixed to the respective hub are at least partially located above the sea surface, and
    wherein the first hub and the second hub are positioned on the deck in such a way that a first center axis of the first hub and a second center axis of the second hub are tilted in relation to the deck so as to increase the distance between the blades affixed to the respective hub and the sea surface.

7. The arrangement according to claim 6,
    wherein the second hub is located above the first hub in such a way that the second center axis of the second hub is tilted in relation to the deck in the same manner as the first center axis of the first hub.

8. The arrangement according to claim 6,
    wherein the second hub is located on the deck of the vessel adjacent to the first hub in such a way that the second center axis of the second hub is tilted in relation to the deck in the same manner as the first center axis of the first hub.

9. The arrangement according to claim 6,
    wherein the first rotor comprises a first blade and a second blade, and
    wherein the first blade is located at least partially above the sea surface, and
    wherein the second blade is located entirely above the deck.

10. A method for transporting a rotor of a wind turbine at sea on a vessel having a deck, comprising:
    positioning a rotor with a hub and a blade on the deck in such a way that a center axis of the hub is tilted in relation to the deck so as to increase the distance between the blade and the sea surface.

11. The method according to claim 10, wherein the hub is positioned on the deck in such a way that the center axis of the hub is tilted substantially along a longitudinal direction of the vessel.

12. The method according to claim 10, wherein the hub is positioned on the deck in such a way that the center axis of the hub is tilted substantially towards the center of the deck.

13. The method according to claim 10, wherein a tilting angle between the center axis of the hub and the deck is in a range of 3 to 15 degrees.

14. The method according to claim 10, wherein the blade includes a blade tip, a substantially concave face and a substantially convex face, and wherein the substantially convex face is directed downwards in relation to the deck and the substantially concave face is directed upwards in relation to the deck such that the blade is bended off the sea surface and the distance between the blade tip and the sea surface is further increased.

15. The method according to claim 10, wherein a first rotor and a second rotor are arranged on the deck, wherein the first rotor comprises a first hub and the second rotor comprises a second hub, wherein at least one blade is affixed to each of the hubs, wherein the first hub and the second hub are positioned on the deck in such a way that the blades affixed to the respective hub are at least partially located above the sea surface, and wherein the first hub and the second hub are positioned on the deck in such a way that a first center axis of the first hub and a second center axis of the second hub are tilted in relation to the deck so as to increase the distance between the blades affixed to the respective hub and the sea surface.

16. The method according to claim 15, wherein the second hub is located above the first hub in such a way that the second center axis of the second hub is tilted in relation to the deck in the same manner as the first center axis of the first hub.

17. The method according to claim 15, wherein the second hub is located on the deck of the vessel adjacent to the first hub in such a way that the second center axis of the second hub is tilted in relation to the deck in the same manner as the first center axis of the first hub.

18. The method according to claim 15, wherein the first rotor comprises a first blade and a second blade, and wherein the first blade is located at least partially above the sea surface, and wherein the second blade is located entirely above the deck.

* * * * *